(12) United States Patent
Rath

(10) Patent No.: US 10,399,910 B2
(45) Date of Patent: Sep. 3, 2019

(54) PROCESS FOR PRODUCING A FOAM CERAMIC

(71) Applicant: Matthias Rath, Vienna (AT)

(72) Inventor: Matthias Rath, Vienna (AT)

( * ) Notice: Subject to any disclaimer, the term of this patent is extended or adjusted under 35 U.S.C. 154(b) by 233 days.

(21) Appl. No.: 15/509,277

(22) PCT Filed: Sep. 14, 2015

(86) PCT No.: PCT/EP2015/070909
§ 371 (c)(1),
(2) Date: Mar. 7, 2017

(87) PCT Pub. No.: WO2016/045996
PCT Pub. Date: Mar. 31, 2016

(65) Prior Publication Data
US 2017/0283331 A1 Oct. 5, 2017

(30) Foreign Application Priority Data
Sep. 24, 2014 (EP) .................................. 14186287

(51) Int. Cl.
C04B 38/10 (2006.01)
C04B 35/18 (2006.01)
(Continued)

(52) U.S. Cl.
CPC .............. C04B 38/106 (2013.01); B28B 1/14 (2013.01); B28B 1/50 (2013.01); B28B 11/243 (2013.01);
(Continued)

(58) Field of Classification Search
CPC ....... C04B 38/106; C04B 35/14; C04B 35/18; C04B 35/185; B28B 11/243; B28C 5/0887; B28C 5/20; B28C 5/24
(Continued)

(56) References Cited

U.S. PATENT DOCUMENTS 4,318,996 A * 3/1982 Magder .................. C04B 38/02
264/42
4,889,670 A * 12/1989 Gurak ................ B01D 39/2093
264/50
(Continued)

FOREIGN PATENT DOCUMENTS

CN 103145444 6/2013
DE 3326271 2/1985
(Continued)

OTHER PUBLICATIONS

International Preliminary Report on Patentability for International Application No. PCT/EP2015/070909.
(Continued)

Primary Examiner — Joseph S Del Sole
Assistant Examiner — Lawrence D. Hohenbrink, Jr.
(74) Attorney, Agent, or Firm — Hoffmann and Baron, LLP

(57) ABSTRACT

The present invention relates to a process for producing a foam ceramic comprising the steps: producing an aqueous suspension of a first mineral raw material; foaming the suspension with air while adding a foaming agent and a binder to form a light foam; mixing the light foam with a powder or slip of a second ceramic raw material to form a heavy foam; pouring the heavy foam into a mold; drying the molded heavy foam in the mold to form a solid foam; and firing the solid foam in the mold to form the foam ceramic.

21 Claims, 1 Drawing Sheet

(51) Int. Cl.
*C04B 35/632* (2006.01)
*B28B 1/14* (2006.01)
*B28B 1/50* (2006.01)
*B28B 11/24* (2006.01)
*B28C 5/00* (2006.01)
*C04B 35/14* (2006.01)
*C04B 35/626* (2006.01)
*C04B 35/63* (2006.01)
*C04B 35/64* (2006.01)
*B28C 5/08* (2006.01)
*B28C 5/20* (2006.01)
*B28C 5/24* (2006.01)
*C04B 35/185* (2006.01)
*C04B 111/28* (2006.01)

(52) U.S. Cl.
CPC .............. *B28C 5/003* (2013.01); *C04B 35/14* (2013.01); *C04B 35/18* (2013.01); *C04B 35/6261* (2013.01); *C04B 35/632* (2013.01); *C04B 35/6303* (2013.01); *C04B 35/64* (2013.01); *B28C 5/0887* (2013.01); *B28C 5/20* (2013.01); *B28C 5/24* (2013.01); *C04B 35/185* (2013.01); *C04B 2111/28* (2013.01); *C04B 2235/3418* (2013.01); *C04B 2235/3427* (2013.01); *C04B 2235/3463* (2013.01); *C04B 2235/3472* (2013.01); *C04B 2235/5436* (2013.01)

(58) Field of Classification Search
USPC .............................................. 264/43, 50, 51
See application file for complete search history.

(56) References Cited

U.S. PATENT DOCUMENTS 5,553,035 A * 9/1996 Seyed-Bolorforosh .....................
B06B 1/0622
310/320
2006/0198939 A1* 9/2006 Smith .................... A61L 27/425
427/2.1
2007/0231884 A1* 10/2007 Kitagawa ................ C04B 38/10
435/289.1
2015/0290834 A1* 10/2015 Klotz ..................... B28B 1/007
210/510.1

FOREIGN PATENT DOCUMENTS

EP          1 842 839         10/2007
GB          2143516           10/1986

OTHER PUBLICATIONS

International Application No. WO 2016/045996 A1.
International Search Report for PCT/EP2015/070909 dated Dec. 1, 2015.
European Extended Search Report (EESR) for Application No. 14186287.0-1351 dated Mar. 5, 2015.

* cited by examiner

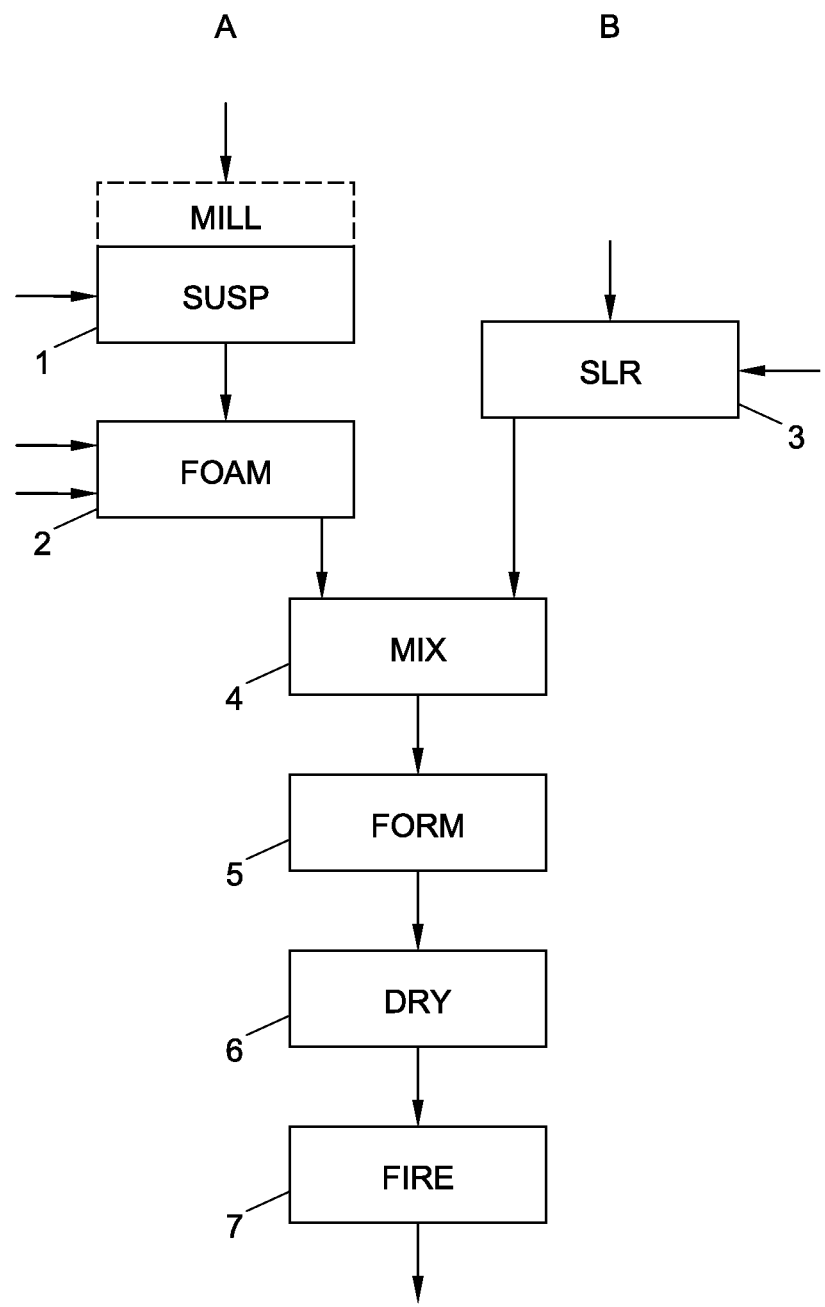

PROCESS FOR PRODUCING A FOAM CERAMIC

CROSS-REFERENCE TO RELATED APPLICATIONS

This application is a National Phase application of International Application No. PCT/EP 2015/070909 filed Sep. 14, 2015 which claims priority to European Patent Application No. 14 186 287.0 filed Sep. 24, 2014, the disclosures of which are incorporated herein by reference.

BACKGROUND

The present invention relates to a process for producing a foam ceramic.

Foam ceramics contain air bubbles, so they have lower density and strength than conventional ceramics, even if the latter have pores. The pore content ("porosity") corresponds to the ratio of hollow space volume to total volume; for example in the case of bricks—e.g., insulating firebricks—it is about 10% to 80%, depending on the raw materials and how they are fired. By contrast, as a rule foam ceramics have a porosity of more than 90% and pores that are produced in a controlled manner.

Foamed mineral materials for construction and other purposes (e.g., foam ceramic) are produced today, for example, in the form of foamed concretes for thermal insulation (see WO 2011/044605 A1 or DE 197 08 799 A1), however, they achieve only very low strength, and therefore are not widely used. Other foam ceramics with a macroporous, open-pored foam structure, such as described, for example, in WO 2013/137727 A1, are used in the filtration of metals.

Three processes are generally known for the controlled production of pores inside fired ceramics: First, it is possible, before firing a free-flowing raw material, for it to be mixed with a porosifying agent, which burns out during firing, leaving behind pores whose particle size and shape correspond to those of the porosifying agent; however, the formation of gas when the porosifying agent is burned out presents the danger of cracking. Second, the free-flowing raw material suspension can be taken up by a structured (open-pored) template, so that the latter is replicated when it is burned out ("replica technique"); however, this process can only be used to produce open-pored foam ceramics that allow flow-through, which are less suitable for insulating materials. Third, direct foaming of the free-flowing raw material suspension can produce a wet foam, and subsequent firing can produce a foam ceramic; the wet foam is quite unstable, so in this case it is difficult to produce pores in a controlled manner.

SUMMARY

The object of the invention is to create a process for producing foam ceramics, which process allows good controllability of the pore size and produces ceramics with low thermal conductivity and sufficiently high strength for insulating materials.

This object is achieved by a process that comprises the steps:

producing an aqueous suspension of a first mineral raw material;

foaming the suspension with air while adding a foaming agent and a binder to form a light foam;

mixing the light foam with a powder or slip of a second ceramic raw material to form a heavy foam;

pouring the heavy foam into a mold;

drying the molded heavy foam in the mold to form a solid foam; and firing the solid foam in the mold to form the foam ceramic.

This process represents a novel hybrid process of direct foaming and the replica technique, in which the light foam of the first ceramic raw material is, so to speak, in the form of a template that is mixed with the slip or the powder of the second ceramic raw material. This allows production of an at least predominantly closed-pore foam ceramic, the second ceramic raw material loading the bubbles of the light foam, i.e., being taken up by their walls, at first stabilizing it and, in the finished foam ceramic, permanently strengthening it. Since the template forms a component of the ceramic structure, it is not burned out, as is the case with a template in the conventional replica technique, so that no gas formation endangering the structure of the foam ceramic occurs. Varying the raw materials, the foaming, and the foaming agent and binder allows the pore size and porosity of the foam ceramic to be adapted, within broad ranges, to different requirements. This process can also be carried out continuously. The foam ceramic produced is suitable, e.g., in the form of a plate, for use as a heat insulator in high temperature ranges up to about 1,000° C. or even about 2,000° C., depending on the raw materials used.

It is favorable to use a lost mold that at least partly burned off in the step of firing. There is a wide selection of such molds with many differences in their properties, so that for various requirements it is much simpler to find a mold that is suitable for the respective requirements than would be possible with reusable molds; for example, it is possible to select a hydrophobic mold that simultaneously allows high vapor diffusion, so that on the one hand this mold does not uncontrollably absorb liquid and, along with it, fine raw material particles from the heavy foam that is poured into it, and even the edge areas of the foam ceramic maintain a uniform solid structure; and, on the other hand it promotes the course of drying by uniform diffusion of the water vapor.

To accomplish this, the mold is optionally made of bagasse or polylactic acid (PLA). These materials are sufficiently hydrophobic, and have a low vapor diffusion resistance. Bagasse and PLA also do not have any detrimental effect on the foam ceramic when burned off.

In advantageous variant embodiments, linear mixers are used for foaming and/or mixing. Such mixers give reproducibly homogeneous light and heavy foams and promote carrying out the reaction as a continuous process.

Since the solid foam is very sensitive, it is optionally not manipulated between the steps of drying and firing. This makes it possible to avoid damage resulting from the release of the solid foam from the mold.

A stable foam ceramic with high strength is produced by the process if the first mineral raw material is a two-component powder made of muscovite mica and quartz, whose d50 particle size, is e.g., maximum 10 µm, optionally about 3 µm.

It has also turned out to be advantageous for the second mineral raw material to be a two-component powder made of muscovite mica and quartz, whose d50 particle size, is e.g., maximum 25 µm, optionally about 4 µm. The d50 particle size designates the particle size that 50% of the particles of a powder raw material fall below. Such mineral raw materials are commercially available, for example, under the trade names Aspolit® F30 (d50=3 µm) or Aspolit® F40 (d50=4 μm) from the company Aspanger Bergbau and Mineralwerke GmbH & Co KG in Aspang, Austria.

In an alternative variant embodiment, the first and the second mineral raw materials are each a powder made of synthetic sintered mullite, whose respective d50 particle sizes are, e.g., maximum 30-40 μm, optionally about 3-5 μm. A foam ceramic based on such a sintered mullite can withstand temperatures up to about 1,600° C., and thus is suitable for applications with especially high temperatures. Such synthetic sintered mullites are commercially available, for example, under the trade name Symulox® M72 (particle size K0 C) of the company Nabaltec AG in Schwandorf, Germany.

To obtain an especially uniform light foam, it is favorable if, in the step of producing, the suspension is wet ground with milling balls for several hours, optionally at least 6 h. This makes it possible to break up agglomerations of the powdered first raw material and achieve a very homogenous particle distribution even before foaming.

It is preferable to use a non-ionic surfactant or a protein as the foaming agent. Such foaming agents not only lead to a high expansion ratio, even allowing the production of an especially light foam, but rather also produce a thicker foam wall of typically about 40 nm, which favors taking up the particles of the second mineral raw material, so that the foam ceramic has especially stable closed pores, and thus an especially low thermal conductivity.

It is especially favorable for the binder to be one or more representatives of the group of cellulose fibers, cellulose derivatives, amylose, amylopectin, or cellobiose. This group has no interactions, or only very small interactions, with the foam and many foaming agents, so that the (wet) light foam already remains very stable, which makes it possible to produce especially light foam ceramics with uniform density.

If the light foam is mixed with slip, the latter is optionally additionally equipped with a liquefier. This makes it possible to reduce the use of water and consequently accelerates drying, shortening the unstable wet phase of the foam. The liquefier simultaneously increases the fluidity of the slip, facilitating the mixing of the light foam with the slip to form a homogeneous heavy foam. It has turned out to be especially effective for the liquefier to be based on alkali huminates and/or alkali silicates. For example, such a liquefier is commercially available under the trade name Dolaflux® SP 11 from the company Zschimmer & Schwarz GmbH & Co KG Chemische Fabriken in Lahnstein, Germany.

The course of the drying is favored if it is carried out at a temperature between 30° and 200° C., e.g. between 40° and 95° C., and optionally at about 50° C. This allows targeted control of the solid foam's properties while it is being produced, without the unstable wet phase promoting disintegration of the heavy foam due to excessively long drying times, and without producing a non-uniform solid foam with cracks in its structure due to excessively rapid drying.

To achieve good sintering so that the foam ceramic has sufficient strength, it is favorable for the firing to be carried out at a temperature between 400° and 2,000° C., e.g. between 500° and 1,650° C., optionally at about 960° C. This avoids excessive firing shrinkage and reduces possible swelling, which leads to uncontrollable pore formation in some raw materials.

BRIEF DESCRIPTION OF THE DRAWINGS

The invention is explained in detail below on the basis of several sample embodiments that are shown in the single attached drawing and are described further below. FIG. 1 shows the inventive process and various variant embodiments of it in a schematic flow chart.

DETAILED DESCRIPTION

FIG. 1 shows the production of an aqueous suspension of a first mineral raw material in step 1 of a process branch A. Optionally, the suspension is wet ground with milling balls for several hours, optionally at least 6 h, to break up agglomerations and homogenize it, as is symbolized by the area of step 1 surrounded by the dashed line in FIG. 1.

In step 2, a foaming agent and a binder are added to the suspension, and it is foamed with air to 5 to 25 times its volume to form a light foam, so that the density of the light foam is about 20 g/L to 300 g/L. The foaming can be done, e.g., with a basket agitator or in a linear mixer.

Foaming agents that can be used are surface-active substances from the classes of the anionic and non-ionic surfactants or plant, animal, or artificial proteins, such as, e.g., ethoxylates, alkyl glycosides, aminoxides, sodium olefin, fatty alcohols, sodium lauryl sulfate, or ammonium lauryl sulfate. Binders that can be used in addition to fire cement also include calcium hydrate, plaster, various forms of silica such as micro or nanosilica, and construction chemistry additives such as starch, cellulose fibers, cellulose derivates or cellobiose, cellulose fibers, cellulose derivatives, amylose, amylopectin, or cellobiose having turned out to be especially suitable. If desired, it is also possible to use two or more different foaming agents and/or binders as well as dehydrating agents in the way know to the person skilled in the art.

In a process branch B that is parallel to, i.e., upstream of, coordinate with, or downstream of process branch A, a powder of a second ceramic raw material is prepared and/or a slip of this raw material is produced in a step 3.

Examples of suitable first or second mineral raw materials are kaolin, metakaolin, mica, feldspar, clay, porcelain, fireclay, silicon dioxide, andalusite and kyanite, bauxite, mullite (fused and/or sintered mullite), aluminum oxide (fused corundum and/or sintered alumina), aluminum zirconium silicate or zircon mullite, zircon or zircon silicate, zirconium oxide or baddeleyite or silicon carbide in various grain sizes, and mixtures of them. Furthermore, already fired, ground ceramics or foam ceramics can be recycled.

In a variant embodiment, the first and second mineral raw materials are both a two-component powder made of muscovite mica and quartz, which, when used as first mineral raw material, has a d50 particle size of maximum 10 μm, optionally about 3 μm, and when used as the second mineral raw material has a d50 particle size of maximum 25 μm, optionally about 4 μm. The d50 particle size is the size that 50% of the particles of a powdered raw material fall below. Such mineral raw materials are available, for example, under the trade names Aspolit® F30 (d50=3 μm) or Aspolit® F40 (d50=4 μm) from the company Aspanger Bergbau and Mineralwerke GmbH & Co KG in Aspang, Austria. According to the manufacturer's data, Aspolit® has the following chemical characteristics: 69.0% $SiO_2$, 14.0% $Al_2O_3$, 5.5% $K_2O$, 2.0% CaO, 2.0% $Fe_2O_3$, 2.0% MgO, 0.4% $TiO_2$, 0.2% $P_2O_5$, 0.03% MnO, 4.87% loss on ignition.

In a variant that is alternative to that, the first and second mineral raw materials are both a synthetic sintered mullite that, e.g., has a d50 particle size of maximum 30-40 μm, optionally about 3-5 μm. Such sintered mullites are available, for example, under the names Symulox® M72 (particle size K0 C) of the company Nabaltec AG in Schwandorf, Germany. According to the manufacturer's data, Symulox® M72 has the following chemical characteristics: 72% $Al_2O_3$, 26% $SiO_2$, 0.3% $Fe_2O_3$, 0.2% $TiO_2$, 0.05% CaO, 0.1% MgO, 0.2% $Na_2O$, 0.6% $K_2O$.

The first mineral raw material can differ from the second in its composition, on the one hand, and in its particle size, on the other hand; however it is also possible for them to have the same composition and/or particle size, as is shown by the mentioned variant embodiments.

To reduce the input of water when the slip is made, it is possible to add a liquefier, e.g., based on an alkali huminate and/or an alkali silicate. One that has proved effective is Dolaflux® SP 11 of the company Zschimmer & Schwarz GmbH & Co KG Chemische Fabriken in Lahnstein, Germany.

In a step 4 according to FIG. 1, the light foam produced in step 2 is mixed (blended) with the powder prepared and/or the slip produced in step 3 to form a heavy foam with a density between 50 g/L and 1,500 g/L, for example with the help of a double-shaft basket mixer or another linear mixer, and after that poured into a mold in a step 5. To avoid the uptake of water and thus also fine particles from the heavy foam, the mold the mold can be hydrophobic, e.g., lined with a polyethylene film.

In the mold, the solid-loaded liquid heavy foam is dried, in a step 6, to form a solid foam, which is fired, optionally while it is still in the mold, i.e., without further manipulation, to form a foam ceramic (step 7).

The drying of step 6 is done, for example, at a temperature between 30° and 200° C., e.g., between 40° and 95° C., optionally at about 50° C., and the firing of step 7 is done at a temperature between 400° and 2,000° C., e.g., between 500° and 1,650° C., optionally at about 960° C.

In step 6 of the drying it is possible to use a hot-air drier, a radio dryer, or a microwave dryer. Depending on the shape and nature of the mold, the humidity of the ambient air, and the moisture in the heavy foam, its components, the type of the dryer and the air circulation in it, the solid foam is dried in it for several hours, typically 3 to 6 hours, until it has a residual moisture of less than 5 weight percent, optionally less than 1 weight percent. As is known to the person skilled in the art, the temperature can be changed during the process, e.g., it can be increased in steps, as is also the case during firing 7. The firing process (step 7) usually lasts less than 6 hours, typically about 1 to 3 hours.

The mold used can be heat-resistant, e.g., a stainless steel wire net or a shell made of fireclay or refractory concrete, and thus be reusable; alternatively, it can be a lost mold that burns as free of residue as possible in step 7 of the firing. Such a mold is made, for example, of a bioplastic, e.g. a cellulose-based plastic, starch, or a starch mixture, polylactic acid (PLA), polyhydroxyalkanoates, or bagasse—or of hydrophobized paper or cardboard—so that it allows high vapor diffusion. Moreover, mixed variants of the molds are possible, e.g., a cardboard mold is supported by a stainless steel wire net, so that only the cardboard portion of the mold burns off, or a shell made of fireclay lined with a possibly perforated polyethylene film, so that only this film burns off.

Some examples of the process are indicated below, and the characteristics associated with the foam ceramics that are produced are given in the following Table 1.

EXAMPLE 1

ASPOLIT® F30 (d50=3 μm) was used as the first mineral raw material, which was wet ground with milling balls for 6 h, yielding a suspension that was 50 weight percent solid. The foaming agent was protein dosed as indicated by the manufacturer, and cellulose fibers were added as a binder; after foaming in a linear mixer, the light foam had a density of about 40 g/L.

A thin-member counter rotating double-shaft basket mixer was used to mix the light foam with an aqueous slip that was produced with ASPOLIT® F40 (d50=4 μm) as the second mineral raw material with the addition of Dolaflux® SP 11 as a liquefier; the resulting heavy foam had a density of 260 g/L.

The heavy foam was poured into a 100×100×40 $mm^3$ cardboard mold lined with polyethylene, dried for 6 h at 50° C., and fired for 2 h at 960° C. in the same kiln, without manipulation.

EXAMPLE 2

In contrast to example 1, in example 2 the first raw material (once again ASPOLIT® F30) was wet ground with milling balls for 8 h and less foamed, so that the density of the light foam was about 60 g/L and the density of the heavy foam was 320 g/L. The drying was done for 5 h at 70° C. All other process parameters were as in example 1.

EXAMPLE 3

In this example, the first raw material was ASPOLIT® F40, which was wet ground with milling balls for 3 h, with a final solids content of about 45 weight percent. The foaming agent and binder used were aminoxide and cellobiose, respectively, which were dosed as indicated by the manufacturer. The light foam had a density of 60 g/L. The slip was produced with ASPOLIT® G200 (d50=18 μm), without additional liquefier. The resulting density of the heavy foam was 380 g/L. The heavy foam was poured into a bagasse mold (100×100×40 $mm^3$), dried for 5 h at 60° C., and fired for 2 h at 1,030° C.

EXAMPLE 4

In this case, ASPOLIT® F30 was wet ground with milling balls for 12 h; the solids content was then 55 weight percent. The foaming agent and binder added were aminoxide (as indicated by the manufacturer) and 2.5 weight percent cement, respectively, and the suspension was foamed to a density of 35 g/L. The density of the heavy foam after mixing with the slip (here: with ASPOLIT® F70, d50=7 μm, and Dolaflux® SP 11 as liquefier) was 220 g/L; once again it was poured into a bagasse mold according to example 3, dried for 4 h at 50° C., and fired for 2 h at 900° C.

EXAMPLE 5

Here mullite, nano alumina, and nano-silica in the form of a powder having a specific surface of more than 50 $m^2$/g were mixed with water in the ratio 2:1; the solids content after that was 60 weight percent. The foaming agent was protein dosed as indicated by the manufacturer, and cellulose fibers were added as a binder; the suspension was foamed to a density of 200 g/L in the linear mixer. After the powdered synthetic sintered mullite (Symulox® M72, particle size KO C with d50=3-5 μm) was sprinkled onto the heavy foam and folded in, its density was 480 g/L. The heavy foam was poured into in a PLA mold, dried for 4 h at 50° C., and fired for 2 h at 1,600° C.

The results of examples 1 through 5 are listed in the following Table 1.

TABLE 1

|  | Ex. 1 | Ex. 2 | Ex. 3 | Ex. 4 | Ex. 5 |
|---|---|---|---|---|---|
| Density of foam ceramic [g/L] | 180 | 220 | 260 | 150 | 310 |
| Porosity | 93.3% | 91.9% | 90.4% | 94.4% | 90.3% |
| Thermal conductivity [W/(m · K)] (ASTM at 200° C.) | 0.06 | 0.07 | 0.1 | 0.07 | 0.27 |
| Cold compression strength [MPa] | 0.25 | 0.7 | 0.8 | 0.2 | 1.0 |

As can be seen, the foam ceramics of all examples 1 through 5 achieved a very low thermal conductivity, and thus good insulation characteristics; the respective cold compression strengths are also comparable with those of conventional low-temperature insulating materials, e.g., foamed polystyrene (such as Styropor®), or are even higher, however the foam ceramics of examples 1 through 5 are fire-resistant, and thus can be used in the high temperature range (over 600° C.)

The invention is not limited to the presented embodiments, but rather comprises all variants and modifications that fall within the scope of the associated claims.

What is claimed is:

1. A process for producing a foam ceramic comprising the steps:
    producing an aqueous suspension of a first mineral raw material;
    foaming the suspension with air while adding a foaming agent and a binder to form a light foam;
    mixing the light foam with a powder or slip of a second mineral raw material to form a heavy foam;
    pouring the heavy foam into a mold;
    drying the molded heavy foam in the mold to form a solid foam; and
    firing the solid foam in the mold to form the foam ceramic,
    wherein the mold is made of bagasse or polylactic acid.

2. The process according to claim 1, wherein linear mixers are used for foaming and/or for mixing.

3. The process according to claim 1, wherein the solid foam is not manipulated between the steps of drying and firing.

4. The process according to claim 1, wherein both the first and the second mineral raw materials are a powder made of synthetic sintered mullite.

5. The process according to claim 4, wherein said powder has a d50 particle size of maximum 40 μm.

6. The process according to claim 4, wherein said powder has a d50 particle size of about 3-5 μm.

7. The process according to claim 1, wherein a non-ionic surfactant or a protein is used as the foaming agent.

8. The process according to claim 1, wherein the binder comprises one or more of cellulose fibers, cellulose derivatives, amylose, amylopectin, and cellobiose.

9. The process according to claim 1, wherein the light foam is mixed with slip, wherein the slip includes a liquefier, and further wherein the liquefier is based on alkali huminate and/or alkali silicate.

10. A process for producing a foam ceramic comprising the steps:
    producing an aqueous suspension of a first mineral raw material;
    foaming the suspension with air while adding a foaming agent and a binder to form a light foam;
    mixing the light foam with a powder or slip of a second mineral raw material to form a heavy foam;
    pouring the heavy foam into a mold;
    drying the molded heavy foam in the mold to form a solid foam; and
    firing the solid foam in the mold to form the foam ceramic,
    wherein the first mineral raw material is a two-component powder made of muscovite mica and quartz.

11. The process according to claim 10, wherein the first mineral raw material has a d50 particle size of maximum 10 μm.

12. The process according to claim 10, wherein the first mineral raw material has a d50 particle size of about 3 μm.

13. The process according to claim 10, wherein a non-ionic surfactant or a protein is used as the foaming agent.

14. The process according to claim 10, wherein the binder comprises one or more of cellulose fibers, cellulose derivatives, amylose, amylopectin, and cellobiose.

15. The process according to claim 10, wherein the light foam is mixed with slip, wherein the slip includes a liquefier, and further wherein the liquefier is based on alkali, huminate, and/or alkali silicate.

16. A process for producing a foam ceramic comprising the steps:
    producing an aqueous suspension of a first mineral raw material;
    foaming the suspension with air while adding a foaming agent and a binder to form a light foam;
    mixing the light foam with a powder or slip of a second mineral raw material to form a heavy foam;
    pouring the heavy foam into a mold;
    drying the molded heavy foam in the mold to form a solid foam; and
    firing the solid foam in the mold to form the foam ceramic,
    wherein the second mineral raw material is a two-component powder made of muscovite mica and quartz.

17. The process according to claim 16, wherein the second mineral raw material has a d50 particle size of maximum 25 μm.

18. The process according to claim 16, wherein the second mineral raw material has a d50 particle size of about 4 μm.

19. The process according to claim 16, wherein a non-ionic surfactant or a protein is used as the foaming agent.

20. The process according to claim 16, wherein the binder comprises one or more of cellulose fibers, cellulose derivatives, amylose, amylopectin, and cellobiose.

21. The process according to claim 16, wherein the light foam is mixed with slip, wherein the slip includes a liquefier, and further wherein the liquefier is based on alkali, huminate, and/or alkali silicate.

* * * * *